United States Patent
Ayoub et al.

(10) Patent No.: US 7,271,713 B2
(45) Date of Patent: Sep. 18, 2007

(54) DIGITAL AUTOMATIC ESCAPE SYSTEM

(75) Inventors: Peter Ayoub, Bryn Mawr, PA (US); Eugene Golubkov, Moscow (RU)

(73) Assignee: Trase, Inc., Falls Church, VA (US)

( * ) Notice: Subject to any disclaimer, the term of this patent is extended or adjusted under 35 U.S.C. 154(b) by 0 days.

(21) Appl. No.: 10/915,737

(22) Filed: Aug. 11, 2004

(65) Prior Publication Data
US 2005/0230545 A1    Oct. 20, 2005

Related U.S. Application Data

(60) Provisional application No. 60/494,285, filed on Aug. 12, 2003.

(51) Int. Cl.
- G01C 5/00 (2006.01)
- G05D 1/00 (2006.01)
- G05D 3/00 (2006.01)
- G08B 23/00 (2006.01)
- G06F 17/00 (2006.01)

(52) U.S. Cl. .......... 340/471; 340/963; 701/9; 701/11

(58) Field of Classification Search ........ 340/945–983; 701/3–18, 36–49; 244/122 A–122 AH, 138 R–152
See application file for complete search history.

(56) References Cited

U.S. PATENT DOCUMENTS

| | | | | |
|---|---|---|---|---|
| 3,630,472 A * | 12/1971 | Axenborg | ............... | 244/32 |
| 4,303,212 A * | 12/1981 | Stone et al. | ........ | 244/122 AD |
| 4,787,576 A * | 11/1988 | McGrady et al. | ....... | 244/122 R |
| 4,792,903 A * | 12/1988 | Peck et al. | ............... | 701/3 |
| 5,894,285 A * | 4/1999 | Yee et al. | ............... | 342/357.07 |
| 5,979,829 A * | 11/1999 | Nance et al. | ............... | 244/141 |
| 6,114,976 A * | 9/2000 | Vian | ............... | 340/945 |
| 6,308,917 B1* | 10/2001 | Ruff | ............... | 244/122 AG |
| 2003/0034902 A1* | 2/2003 | Dickau | ............... | 340/945 |

* cited by examiner

*Primary Examiner*—Daniel Wu
*Assistant Examiner*—Jennifer Mehmood
(74) *Attorney, Agent, or Firm*—Orzechowski & Barry, LLC; Karen Orzechowski; Robert Lev

(57) ABSTRACT

A pilot seat ejection system for use in a number of environments, can be designated for automatic operation. A microprocessor, or other on-board computer, uses avionic sensors to sense an irreversible catastrophic or dangerous situation, thereby initiating automatic ejection. While the system is particularly applicable during vertical operation of an STOVL Aircraft, the present system can be used on a wide variety of different vehicles in a wide variety of different situations.

39 Claims, 5 Drawing Sheets

Fig. 1 Schematic diagram of AES

Fig.3 Module-2

Fig. 4 Module-3

DIGITAL AUTOMATIC ESCAPE SYSTEM

CROSS REFERENCE TO RELATED APPLICATIONS

This application claims the benefit of U.S. Provisional Application 60/494,285 filed on Aug. 12, 2003.

FIELD OF THE INVENTION

The present invention generally relates to vehicle crew emergency escape initiation systems, especially for use in rapidly developing emergency situations. In particular the present invention is directed to aircraft ejection seat systems operating when the time available for the aircrew to assess the situation and initiate an ejection may be insufficient to initiate ejection manually.

BACKGROUND OF THE INVENTION

Modern high speed aircraft are equipped with escape systems with predetermined safe ejection envelopes as measured by acceptable speed, flight altitude, aircraft roll and pitch angles, and sink rate, as well as other factors such as seat and aircraft characteristics. If an ejection takes place within the safe ejection envelope of, for example, an ejection seat, aircrew can survive ejection even at the outer margins of an aircraft's flight envelope, including take-off, landing, and even zero altitude and zero air speed conditions. All existing aircraft escape systems are actuated manually, subsequent to aircrew evaluation of the circumstances leading to a decision to eject.

One of the most complex and demanding examples of vehicle escape system is found in high-speed military aircraft, such as jet fighters, attack craft and even bombers. In such military aircraft, the aircrew assesses a situation, and when ejection is believed to be warranted, one of the members of the crew will initiate the process of ejection. This will vary from aircraft to aircraft, depending upon the configuration of aircrew placement within the aircraft.

In conventional high-speed jet fighters, ejection is usually initiated by pulling on an ejection handle, squeezing an ejection handle or a similar device to initiate the ejection sequence.

Operation of the ejection process for a conventional ejection seat is highly automated after initiation of the ejection sequence by the aircrew. However, in conventional aircraft, ejection takes place only after the aircrew has gone through a decision-making process based upon perceived conditions of the aircraft or surrounding environment. This is crucial since the pilot (and other crew if the aircraft is so configured) must be able to clear the aircraft as quickly as possible, while at the same time avoiding hitting any part of the aircraft, or each other.

The relatively long aircrew decision process could be considerably shortened by an automatic ejection system. However, such systems have not been contemplated due to difficulties in providing a fail-safe against unintended ejections. Such ejections have severe consequences of leaving a plane without control, and endangering the ejected aircrew.

In certain types of modern aircraft various emergencies can develop so rapidly that aircrew have insufficient time to evaluate the situation and initiate ejection within the seat's safe ejection envelope. This is particularly relevant for short take-off vertical landing aircraft (STOVL) in "vertical" modes of flight (hover, short take-off, transition, vertical landing, when STOVL speed is less than control speed and aerodynamic forces are insufficient to support the aircraft in flight). Power plant or reaction control failures in these regimes lead to uncontrolled STOVL descent combined with violent rotation in roll and pitch. In such circumstances the time available for evaluation of the situation and initiation of ejection, within the ejection seat's safe ejection envelope, is not more than two or three seconds.

Another example of a rapidly developing emergency situation can be the failure of either the catapult or aircraft power plant during launch of aircraft carrier based aircraft. If the aircraft is insufficiently accelerated to achieve flight velocity, it settles into the water within 2 or 3 seconds after launch. Likewise, in conventional land based operations, while in transition just after take-off or prior to landing, the onset of rapidly developing emergencies that prevent or inhibit controlled flight, may not permit aircrew sufficient time to effect safe ejection.

Consequently, survival in rapidly developing irreversible emergencies could be significantly improved by the addition of an automatic system for initiating ejection from aircraft (as well as for a wide variety of vehicles). An automatic escape system, by providing an appropriate response for the detection of a catastrophic (irreversible, or unrecoverable) situation would eliminate the time required for pilot decision-making and ejection initiation from the ejection timeline.

SUMMARY OF THE INVENTION

Accordingly, it is one object of the present invention to overcome the limitations of conventional ejection systems.

It is another object of the present invention to provide an ejection system that can operate automatically in a time-frame during which air crew is unable to respond effectively.

It is a further object of the present invention to provide an automatic escape system that interfaces with conventional aircraft multiplex digital data bus terminals.

It is an additional object of the present invention to provide an automatic escape system that does not interfere with manual ejection.

It is still a further object of the present invention to provide an automatic escape system that is easily adapted to operate with STOVL aircraft.

It is yet another object of the present invention to provide an automatic escape system that is adaptable for use with a wide range of aircraft, and even other types of vehicles.

It is still an additional object of the present invention to provide an automatic escape system which can be adapted to the safe ejection envelope of any aircraft, portion of an aircraft, or ejection seat.

It is still a further object of the present invention to provide an automatic escape system that can trigger ejection based upon a variable number of parameters.

It is yet an additional object of the present invention to provide an automatic escape system that can use a variety of different algorithms using inputs from the aircraft operating parameters to determine the proper time for ejection.

It is again a further object of the present invention to provide an automatic escape system in which vehicle operational parameters can be balanced with each other by an algorithm so that the conditions for automatic ejection can be pre-selected in accordance with vehicle characteristics, and even environmental characteristics.

It is still a further object of the present invention to provide an automatic escape system that responds automatically and instantly to a detected catastrophic or unrecoverable situation, thereby eliminating the delays entailed by aircrew recognition and decision-making.

It is again another object of the present invention to provide an automatic ejection system that can compensate for the loss of some sensors without an inappropriate activation of the ejection system.

These and other goals and objects of the present invention are accomplished by an automatic emergency device actuation system for a vehicle. This system includes a device for inputting constant system values and detected values from sensors. There is a first computing function for comparing the constant and the detected values to determine an alert condition. There is a second computing function, which operates responsive to the alert condition, and which compares the constants and the detected values to determine an irreversible or non-recoverable condition. A checking device is used to verify or determine if the vehicle is in a safe range for operation of the emergency device. An activation device operates responsive to detection of the safe range and an irreversible condition to send an activation signal to actuate the emergency device.

In another manifestation of the present invention, a process for operating an automatic emergency device actuation system is carried out for a vehicle. The steps include inputting constant system values and detected values from sensors into the system. Afterwards, the constant system values and the detected values are compared to determine the existence of an alert condition. Responsive to detecting an alert condition, the constant system values are then compared to detected values to determine the existence of a dangerous condition. The system also checks to determine if the vehicle is in a safe range for emergency device operation. Finally, responsive to detection of the safe range and existence of a dangerous condition, an activation signal is sent to release the emergency device.

DETAILED DESCRIPTION OF THE PREFERRED EMBODIMENTS

The present invention is directed to a system and software that controls automatic aircrew ejection within the safe ejection envelope of an ejection seat during rapidly developing emergency situations associated with modern aircraft, and especially STOVL aircraft. This capability is applicable to any ejection seat system-aircraft combination, once the software is adjusted to take the specific performance of the ejection system in use and the aircraft into account.

The automatic ejection system (AES) software digitally processes aircraft motion and condition parameters, drawn from the aircraft's multiplex digital data bus terminal (13), with the help of an algorithm and program that define the ejection moment by delivery of an execution command to the ejection actuator (4) (electrically fired initiator) of the ejection seat.

Figure 5:
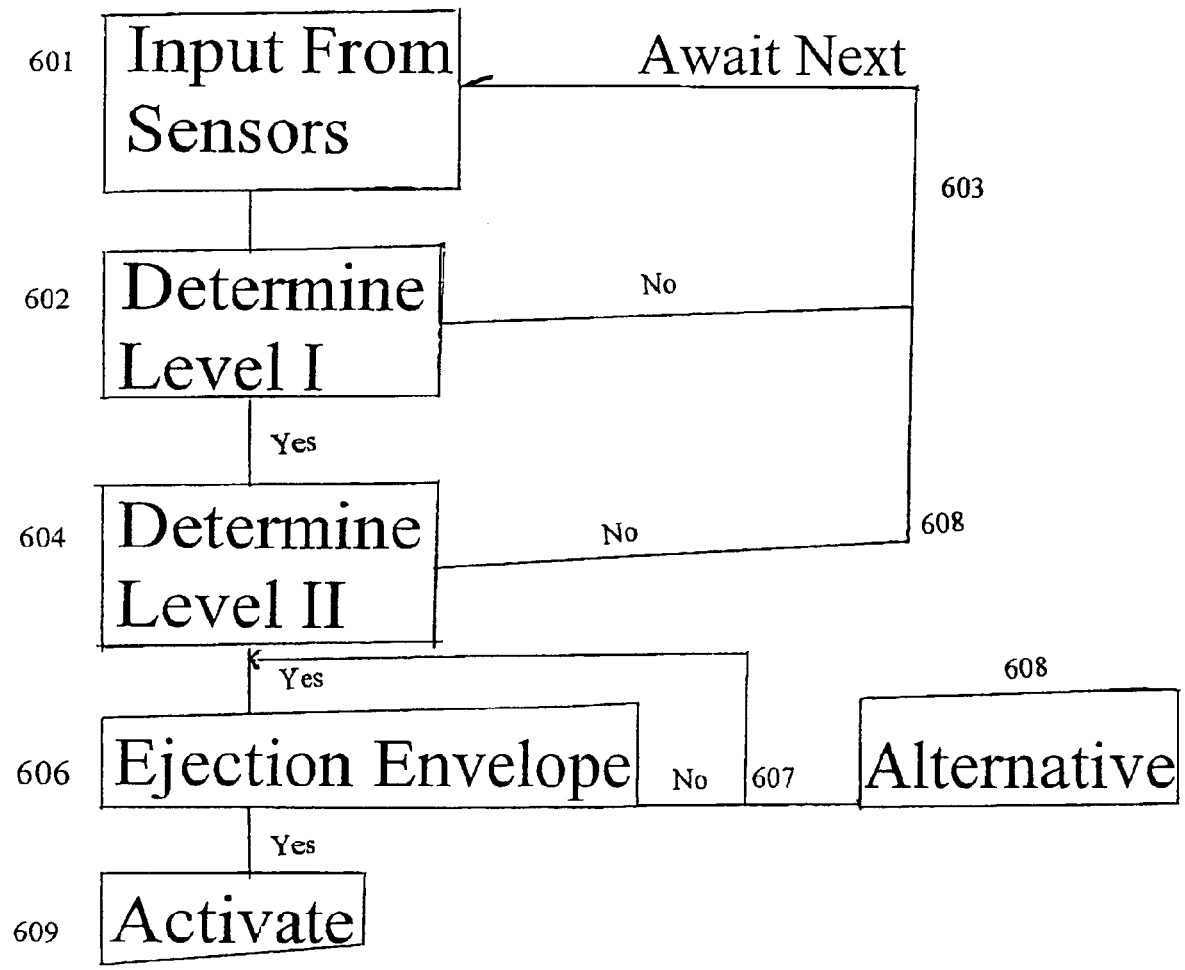
FIG. 5 is a generalized flow diagram depicting the overall operation of the present invention.

FIG. 5 depicts the logic for a flow chart illustrating the most basic operation of the present invention. The logic of FIG. 5 can be applied not just to STOVL aircraft, the object of multiple embodiments described in the subject application, but can also be applied to other aircraft.

In other embodiments of the invention, different parameters can be used so that the present invention can apply to landing balloons, braking parachutes, slides, escape hatches and other emergency systems. Further, these systems need not be confined to aircraft. Rather, the present invention can be used to activate emergency escape systems on boats and other vehicles. Thus, the present invention can be used with hatches, slides and balloon cushioning systems.

The first step, 601 in the flow diagram of FIG. 5 includes the input from selected aircraft (or other vehicle) sensors. The sensors selected and the parameters input will be determined based upon the characteristics of the individual aircraft or vehicle. The STOVL parameters have been selected merely as representative of an example to which the present invention is particularly applicable. Preferably, there are constant updates in the readings from the sensors so that step 601 is constantly being repeated. Further, where appropriate, inputs of the same parameters from multiple sensors are preferably used.

While step 601 represents the constant input of sensor readings, data input is not confined to this. Rather, step 601 also represents the input of system constants against which the sensor values will be compared. These constant system values are determined based upon aircraft parameters, ejection seat parameters, or any other condition which might be relevant to the safe operation of the emergency release device (the ejection seat in the present case).

At step 602 sensor-derived values are evaluated to determine if a potentially dangerous or "alert" situation might exist (a Level I condition). Preferably, this evaluation is constantly carried out on a number of different sensor-generated values (such as aircraft roll angle, aircraft pitch angle and aircraft roll and pitch rates). If an "alert" situation is not determined, then the system operates as indicated at step 603. This simply means that the next group of sensor inputs will be awaited, and no additional action will be taken beyond this.

If, on the other hand, a potentially dangerous mode of flight is detected at step 602, then the system proceeds to step 604 for further evaluation. Here, a determination is made that the aircraft has not only entered a potentially dangerous mode, but an irreversible situation (Level II) exists. If the situation is not irreversible, then the system moves to step 605, and the next sensor inputs are awaited. Virtually any type of method can be used to determine a Level II (irreversible) condition, which would necessitate automatic ejection.

If calculations based on sensor inputs indicate that an irreversible flight situation has occurred, then the system moves to step 606 for another determination to be made. In particular, an evaluation of the current flight situation and the safe ejection envelope are carried out to determine if it is still safe to eject. If the safe ejection envelope is no longer maintained, the system moves to step 607 where failure of the safe envelope is indicated and ejection is not initiated.

If the ejection safety envelope is still maintained, then the system moves on to step 609, initiating ejection of the ejection seat. For other aircraft or vessels, other actions could be initiated. These might include the operation of emergency hatches, deployment of parachutes, or the activation of alternative landing gear, such as bags or cushions. It should be understood, that almost any emergency system, on almost any appropriate vehicle can be activated using the logic of this aspect of the present invention. However, the most efficacious application appears to be for STOVL or similar aircraft, and the use of ejection seats.

The presence of the AES doesn't influence or prevent manual ejection at any time and is intended to enhance escape system efficiency by removing the elapsed time required for aircrew to complete actions related to ejection (assessment, decision, and initiation of the ejection sequence) during rapidly developing emergency situations.

Figure 1:
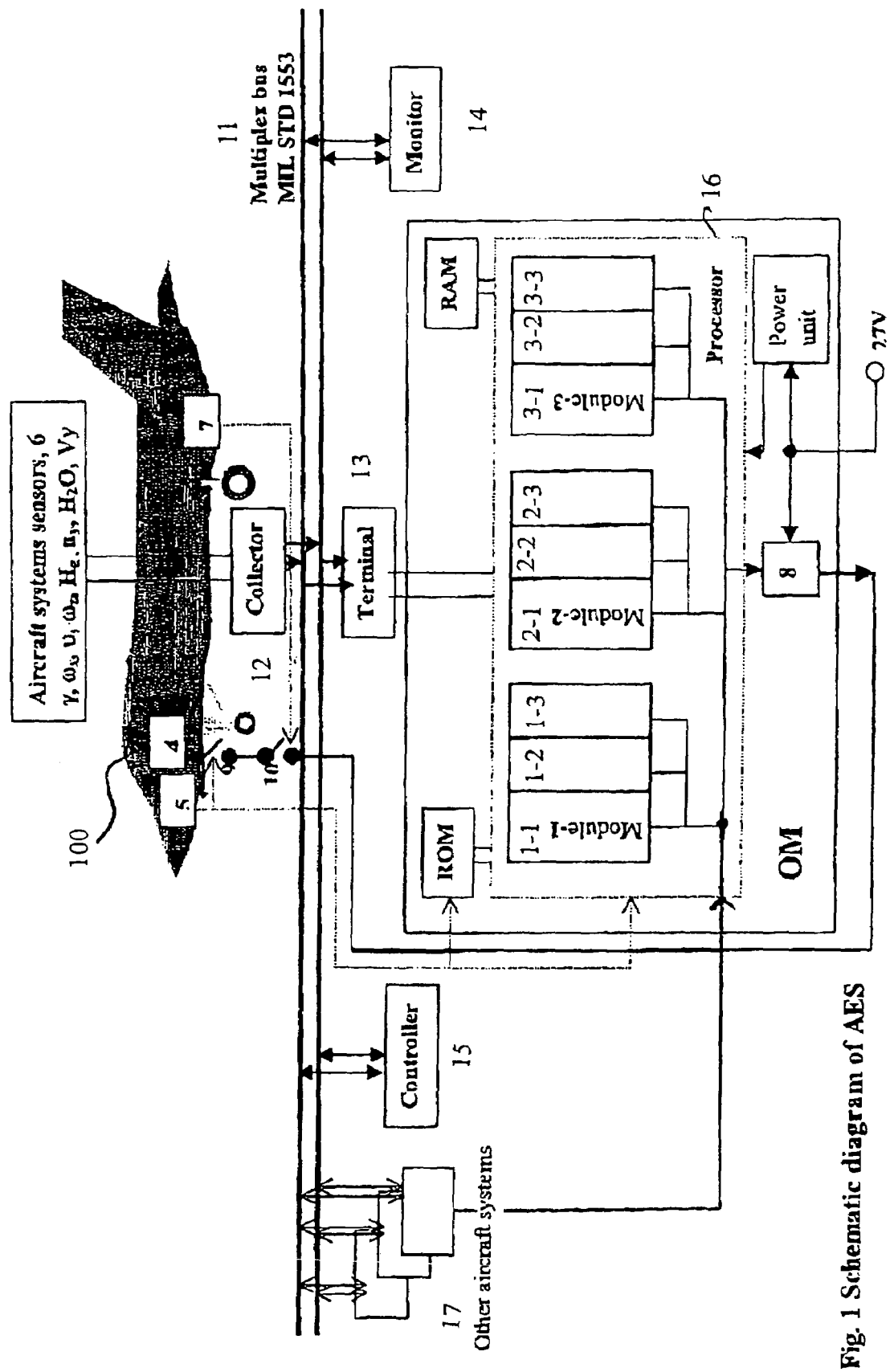
FIG. 1 is the AES schematic diagram, depicting a processor with software that automatically controls the system to eject aircrew during rapidly developing, irrecoverable aircraft emergencies.

Such emergency situations tend to be intensified for vertical lift aircraft such as jet (100) depicted in FIG. 1. This example of an STOVL aircraft is merely for exemplary purposes. Other types of aircraft and other vehicles can use the ejection system of the present invention. Further, while an ejection seat is used in the example of FIG. 1, modifications of the present invention can be used for escape hatches, blowout panels, balloon cushioning systems, and the like, on a variety of different types of vehicle.

This invention (as depicted in FIG. 1) uses software to automatically initiate aircrew ejection from jet (100) (without aircrew participation) in rapidly developing emergency situations. The operation of the present invention thus enhances the time efficiency of escape systems, especially for STOVL aircraft. This is done by removing the time expenditure related to aircrew activity tied to assessing an emergency situation, making the decision to eject, and physically initiating the ejection sequence.

The software controlling the ejection may be housed in a dedicated microprocessor as part of the ejection seat, or elsewhere, or as a sub-routine in any of a number of other onboard processors (16), including the main onboard computer (15). Aircraft sensors (6) provide digital information to the processor through an aircraft multiplexed digital data bus (11) compliant with MIL STD 1553 or subsequent standards.

Proper AES functioning requires inputs for a number of parameters including aircraft angular position relative to its axis (roll angles ($\gamma$), pitch angles ($\upsilon$)), and the rates at which change in position is occurring (roll rates ($\omega_x$), pitch rates ($\omega_z$)). Other inputs include aircraft physical height above ground of the aircraft ($H_g$), vertical g-load ($n_y$), and aircraft sink rate ($V_y$). Engine performance indications are also used to indicate engine failure (full throttles, decaying RPM, no fuel flow, decaying exhaust gas temperatures, and the like), as well as aircraft velocity.

Signals indicating the state of other aircraft system (17) can also be used as input to processor (16). Depending upon the vehicle used, the priority given to signals indicating the state of other aircraft systems could be used in the calculations carried out by one of the three modules (or additional modules, which are contemplated within the scope of the present invention), or could be used to directly activate power switch (8) to trigger immediate ejection. For example, with an STOVL aircraft, an indication that a fan shaft has broken or otherwise malfunctioned would result in an immediate activation of the ejection initiators (4). In effect, the kind of catastrophic condition equivalent to a broken fan shaft could be used to initiate ejection.

It should be noted that automatic initiation of ejection under the present invention is permitted only within a predetermined portion of the flight profile (such as take-off, cruise, landing, and the like). This means that certain conditions must obtain before the ejection system will operate at all. In the example of FIG. 1, switch (9) is activated by the crew (through panel (5)), thus requiring active crew participation to actualize the system. Switch (10) also must be closed to allow the ejection system to operate. Switch (10) is activated by engine nozzle position detector (7) indicating whether or not the aircraft is configured for vertical flight. Absent aircrew activation of the system or confirmation of entry into the vertical flight regime, the auto escape system is not enabled.

In the alternative, on a non-STOVL aircraft, switch (10) can be activated by the position of the landing gear, and a weight off wheels switch, indicating that the landing gear is down, but that the aircraft is in flight. It should be noted that other aircraft or vehicle condition indicators can be used to limit auto escape system operation to specific parts of the flight profile while locking it out from all other parts of the flight profile. The only constraints are the characteristics of the vehicle itself, and the circumstances of its intended use.

Most of the required information is found in the typical flow of information through a multiplexed digital data bus (11). The data are received and processed by three modules (1, 2, 3) or subprograms contained within the processor (16). The modules can function independently of each other and can be switched on and off depending on aircraft type, operating environment and aircrew decision.

Module-1 senses and responds to changes in aircraft angular motion associated with rapidly developing emergency situations characterized by violent angular rotation. Module-1 is intended primarily for improvement of STOVL aircraft escape system performance, but is fully applicable to conventional aircraft as well.

Module-2 senses and responds to power plant conditions during take-off/landing and can be used for all aircraft types. This module can also be used for other types of vehicles.

Module-3 senses and responds to imminent aircraft water entry immediately subsequent to catapult from an aircraft carrier when improper catapult operation or engine failure, either in combination or alone, result in sufficient sink rate to prevent achieving velocity sufficient to sustain flight prior to impact with the water.

Each module gets the digital information required for its functioning from the multiplex digital data bus (11), processes this information with the help of its particular algorithm and program, and, if specific conditions are met, generates a signal to a power switch (8) to supply electrical power to the ejection seat's electrically fired initiator (4). Subsequent to this event, air aircrew ejection takes place in the same manner as it would when initiated through use of standard ejection handles.

For simplicity, only one channel of the processor is shown on FIG. 1. In fact the processor includes three similar channels each with three modules for reliability. The power switch (8) is activated when any two of the three channels deliver similar output signals. However, other combinations, as well as other modules, can be used.

In one preferred embodiment, two switches (9) and (10) hold the processor output signal circuit, one of them is controlled by aircrew from the AES control panel (5) in the cabin, and the other switch indicates when the STOVL aircraft is in the "vertical" mode of flight. Determination that the aircraft is in the "vertical" mode may be based on engine nozzle (7) rotation to an angle less than, say, 45° from vertical. Thus, if the engine nozzle is rotated beyond 45° from vertical (thrust vector in line or approaching the longitudinal axis), the AES cannot be put in operation.

It is possible to use other dynamic characteristics associated with the STOVL aircraft being in the "vertical" mode of flight. Such characteristics include, for example, lift engine, lift fan door position, and the like. The selection of characteristics to indicate entry into or departure from vertical operations will depend on aircraft type.

The closed state of switches (9) and (10) indicate that the AES is switched on by the aircrew through control panel (5) (aircrew entrusts the AES), and that STOVL aircraft is in the "vertical" mode of flight (hover, short take-off, transition, vertical landing) at less than aerodynamic control speed, as indicated by engine nozzle (7).

In another embodiment for conventional take-off/landing aircraft the blocking switch (10) can be installed on landing gear main struts and be activated through weight-off-wheels switches, and deactivated upon touchdown or retraction of the landing gear.

The AES system, as depicted in the schematic diagram shown on FIG. 1, includes:

1) a modern ejection seat system (Mk16E, ACES, and the like) equipped with electrically fired ejection initiators (4), in addition to conventional handles for initiation of manual ejection (not shown). The electrical initiator (4) is activated by an electrical signal and performs the same functions as the ejection handle, but without aircrew participation;

2) onboard digital processor (16) or microcomputer including the power switch (8). Power switch (8) is connected to the aircraft multiplex digital data bus (11) compliant with MIL STD 1553 or other similar standards, that receives parameters and signals of aircraft motion and state from various aircraft sensors (6), processes them in Modules-1, -2, -3 according to special algorithms and programs. Power switch (8) is also connected with the ejection seat system electrically fired initiator (4);

3) blocking switches (9) and (10), controlled by aircrew (9) and engine nozzle (7) rotation (for STOVL aircraft) or landing gear related sensors (gear down, weight off wheels for aircraft with conventional take-off, not shown) or other similar aircraft devices that reflect the condition of flight (take-off, landing, hover, and the like) that put the AES in operation in "vertical" modes of flight (for STOVL aircraft) or at take-off/landing for conventional take-off aircraft; and, 4) appropriate electrical circuitry and a control panel (5) in the cockpit for actuation of the mentioned elements, their control, and to determine the operational state (on-off).

The schematic diagram of the processor that is shown on FIG. 1 is simplified; so that only one channel of each Module-1, -2, -3 is illustrated. Actually each Module consists of three identical channels, their outputs can be combined for reliability as a "majority" voted circuit. Two similar signals from any of the three channels of a given Module are enough to energize the power switch (8) in the example of FIG. 1. However, other logic arrangements can be used.

The MIL STD 1553 multiplex digital data bus (11), bus controller, monitor (14), aircraft systems sensors (6), and the like, are standard equipment in modern aircraft, and should provide the necessary digital information input to the processor (16) with controller frame times of not more than 10 ms (0.01 s) for response to rapidly developing emergency situations.

When the AES control panel (or user interface) (5) is used by the aircrew to turn the AES on, the typical computer start up process is initiated: initialization, testing, self-control, setting of parameters, Module(s) selection, check of power switch contacts functioning, and the like. After the start up cycle is complete, an "AES ready" light appears on the control panel (5). The ready light indicates that the processor (16) is receiving data from the multiplex digital data bus (11); its software is processing this information in the appropriate Modules, which are, in turn, sensing and responding appropriately.

However, the AES system is not switched on (operational), unless both switches (9) and (10) are closed. This means that not only has the aircrew switched the system on because the AES system is deemed to be necessary for the mode of flight ahead but, at the same time, the STOVL aircraft (in the example of FIG. 1) is in the "vertical" mode of flight (engine nozzle (7) less than 45° from vertical). For conventional take-off/landing aircraft the system responds to take-off/landing regimes based on landing gear related indicators rather than the "vertical" regime related to STOVL operations.

Figure 2:
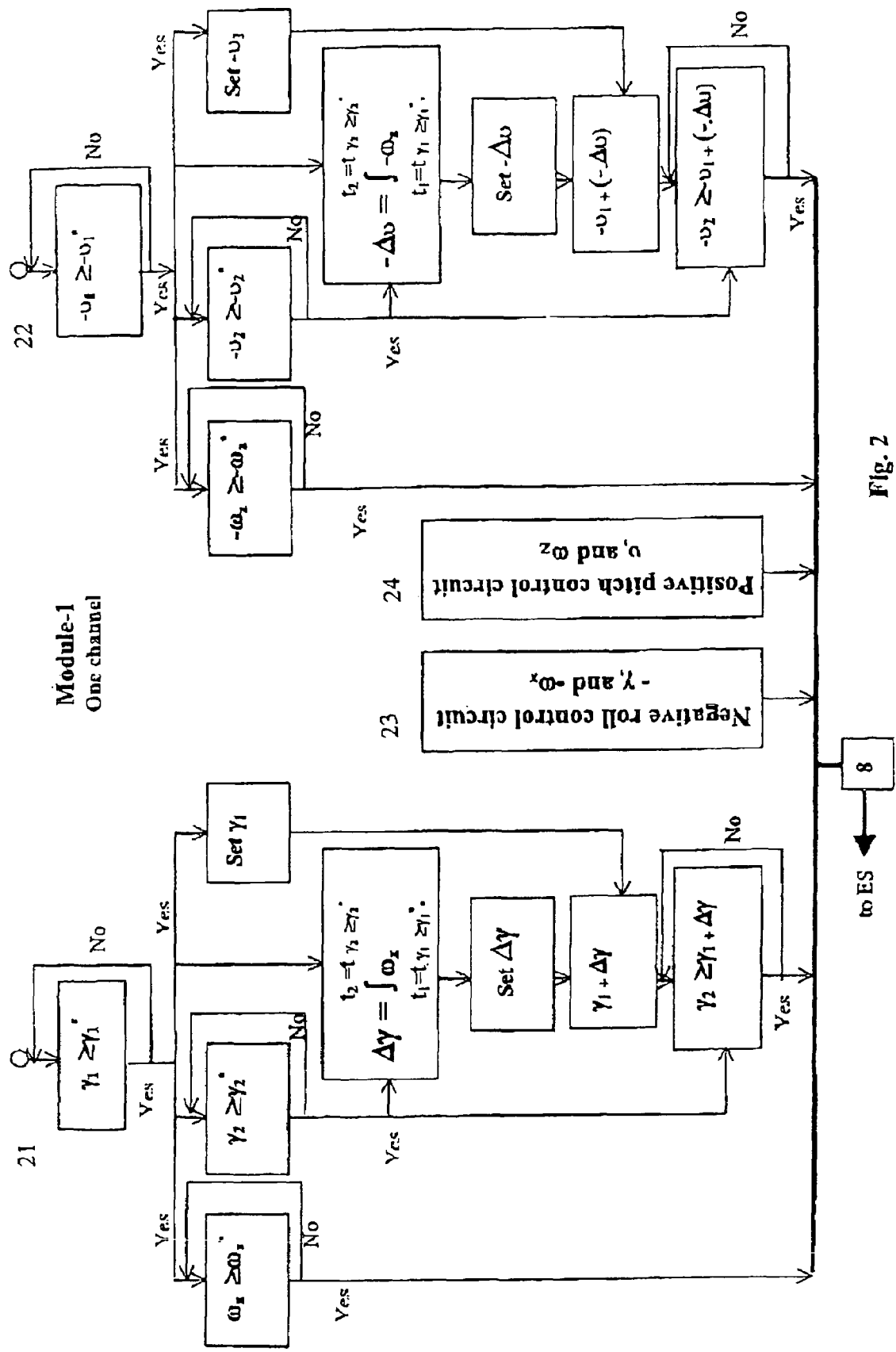
FIG. 2 is a flow diagram depicting an algorithm of Module-1, which senses and responds to aircraft angular motion.

The flow diagram (21) of one of the three Module-1 channels is shown on FIG. 2 as an example. This channel receives the following digital input data from at least two independent aircraft sensors (for example, two separate aircraft vertical gyros): two aircraft current roll angles ($\gamma_1$ and $\gamma_2$), two aircraft current pitch angles ($\upsilon_1$ and $\upsilon_2$) and two aircraft current roll and pitch rates ($\omega_x$ and $\omega_z$). However, more sensors or fewer sensors could be used. The processor (16) stores the control parameters data, designated with *. These include: $\gamma_1{}^*, \gamma_2{}^*, -\gamma_1{}^*, -\gamma_2{}^*, \upsilon_1{}^*, \upsilon_2{}^* -\upsilon_1{}^*, -\upsilon_2{}^*, \omega_x{}^*, \omega_z{}^*$.

Parameters $\gamma_2{}^*, -\gamma_2{}^*, \upsilon_2{}^*, -\upsilon_2{}^*$ correspond to aircraft roll and pitch angles that are limiting values for safe ejection for a specific ejection seat system and specific aircraft at sea level, while experiencing a low rate of change in aircraft attitude. Parameters $\gamma_1{}^*, -\gamma_1{}^*, \upsilon_1{}^*, -\upsilon_1{}^*$ are also limiting values for safe ejection at sea level, but in situations with a high or violent rate of change in aircraft attitude. These parameters are predetermined and specified for each type of ejection system for each type of vehicle.

The Mk 16 ejection seat, for example, is reported to provide safe ejection at sea level with the following limiting parameter combinations:

$$\gamma_1{}^* = -30°, \omega_x \geq -30°/s \text{ and } Vy = -10 \text{ m\textbackslash s}.$$

The logic chart (21) on FIG. 2 functions in the following manner. If the AES is switched on and aircraft roll is more than $\gamma_1{}^*$, and at the same time the current rate of roll $\omega_x$ exceeds the $\omega_x{}^*$ value, a signal is generated to power switch (8) that energizes the electrically fired initiator (4) of the ejection seat system. It should be noted that the sign values of $\gamma_1$ and $\omega_x$ must be the same, that is the angular rate signal confirms the aircraft tendency to growing rotation and process irreversibility. This type of emergency could be indicative of STOVL aircraft engine or reaction control failures in "vertical" modes of flight.

If an emergency is not violent ($\omega_x < \omega_x{}^*$) (i.e. is not as rapidly developing), but nonetheless is irreversible and condition $\gamma_1 \geq \gamma_1{}^*$ is met, then a current $\gamma_1$ value is set and an integrator is switched on to calculate the roll increment $\Delta\gamma$, and, when the condition $\gamma_2 \geq \gamma_2{}^*$ is satisfied, the angle increment value is added to $\gamma_1$ set value and the result is compared with current $\gamma_2$ value. When the condition $\gamma_2 \geq \gamma_1 + \Delta\gamma$ is met, the signal is generated to power switch (8) that energizes the electrically fired initiator (4) of the ejection seat system. This type of emergency is peculiar to STOVL aircraft in transition mode at speeds close to aerodynamic control speed.

The present invention appears to be particularly well adapted for STOVL aircraft. However, other similar aircraft would benefit from the present invention, as well as aircraft that could rely entirely upon vertical thrust for take off before relying upon normal horizontal thrust to create lift on the airfoils.

Depending upon the aircraft, certain parameters can be used to determine irreversible entry into an unrecoverable emergency situation. The selected parameters may include, but are not limited to, aircraft roll angle, aircraft pitch angle, and aircraft roll rate and aircraft pitch rate. A list of these parameters and fuller elaboration is provided in Table 1.

TABLE 1

List of Parameters in Data Frame Delivered to the AES From BC

| Parameter | Variable Name | Units | Precision | Source | Destination |
|---|---|---|---|---|---|
| Roll Angle $\gamma_1$ | Roll1 | Degree | ±0.5° | INS No 1 | Module-1, Channel-1 |
| Roll Angle $\gamma_2$ | Roll2 | Degree | ±0.5° | INS No 2 | Module-1 Channel-1 |
| Pitch Angle $v_1$ | Pitch1 | Degree | ±0.5° | INS No 1 | Module-1 Channel-1 |
| Pitch Angle $v_2$ | Pitch2 | Degree | ±0.5° | INS No 2 | Module-1 Channel-1 |
| Roll Angle $\gamma_1$ | Roll1 | Degree | ±0.5° | INS No 2 | Module-1 Channel-2 |
| Roll Angle $\gamma_2$ | Roll2 | Degree | ±0.5° | INS No 1 | Module-1 Channel-2 |
| Pitch Angle $v_1$ | Pitch1 | Degree | ±0.5° | INS No 2 | Module-1 Channel-2 |
| Pitch Angle $v_2$ | Pitch2 | Degree | ±0.5° | INS No 1 | Module-1 Channel-2 |
| Roll Rate $\omega_x$ | OmegaX | Degr/sec | ±1°/sec | INS No 1 | All channels |
| Pitch Rate $\omega_z$ | OmegaZ | Degr/sec | ±1°/sec | INS No 2 | All channels |
| AES on/off switch | AES ON | Yes/no | Logic | Control panel | Module-1 output circuit |
| Nozzle Position | Nozzle $\phi_{n<45}°$ | Yes/no | Logic | Nozzle sensor | Module-1 output circuit |
| BIT Button | Test beginning | Yes/no | Logic | Control panel | AES Checking |

It has been found these parameters to be particularly sensitive to the ongoing conditions of the aircraft, especially in the vertical flight modes. These parameters, along with the aircraft rate of sink have only a limited range of permissible values during vertical flight. Consequently, it has been found that they provide a very good indication of when an unstable situation has become irreversible. At different altitudes, different angles or angular rates, as well as sink rate, become even more critical.

Table 2 lists certain constants that have been used to determine the operational envelope and permissible limits of automatic escape system functionality. These limits vary depending upon the aircraft and ejection seat combination used.

TABLE 2

List of Constants

| Constant | Constant Name | Units | Precision | Destination |
|---|---|---|---|---|
| $\gamma_1^*$ | AlertRoll | degree | ±0.5° | Module - 1, Positive roll |
| $-\gamma_1^*$ | AlertRoll | degree | ±0.5° | Module - 1, Negative roll |
| $v_1^*$ | AlertPitch | degree | ±0.5° | Module - 1, Positive pitch |
| $-v_1^*$ | AlertPitch | degree | ±0.5° | Module - 1, Negative pitch |
| $\gamma_2^*$ | TopRoll | degree | ±0.5° | Module - 1, Positive roll |
| $-\gamma_2^*$ | TopRoll | degree | ±0.5° | Module - 1, Negative roll |
| $v_2^*$ | TopPitch | degree | ±0.5° | Module - 1, Positive pitch |
| $-v_2^*$ | TopPitch | degree | ±0.5° | Module - 1, Negative pitch |
| $\omega_x^*$ | TopOmegaX | deg/sec | ±1°/sec | All channels |
| $\omega_z^*$ | TopOmegaZ | deg/sec | ±1°/sec | All channels |

The constant names are defined as:
AlertRoll - the threshold angle from the roll source at which the algorithm begins to track AC roll;
TopRoll - the second threshold roll angle;
TopOmegaX - the threshold for angular roll rate
AlertPitch, TopPitch, TopOmegaZ - the analogous thresholds for the pitch channel.

It should be understood that the constants in Table 2 are assigned for particular aircraft based upon calculations to determine a realistic safety envelope at various altitudes. Since altitude is involved, the safety envelope depends upon the dynamics of the situation, as well as the characteristics of a particular type of ejection seat.

For an exemplary STOVL aircraft and ejection seat, the following constants found in Table 2 are applied, as are the values of Table 1. Another relevant parameter is the engine nozzle rotation angle (always crucial in an STOVL aircraft). This was selected as the aircraft device that indicates entry into a particularly dangerous mode of flight, in this case, the vertical lift mode.

In the present example, an STOVL aircraft reflecting the parameters of Tables 1 and 2 is being operated in the vertical flight mode. This means that the engine nozzle position is very close to the vertical position, and defines the "state of the aircraft." Further, the AES of the present invention must have been specifically activated by the aircraft crew.

The most basic approach to determining if an irreversible dangerous situation has occurred is by a direct check of input from the sensors and the comparison of these inputs to the system constants of Table 2. For example, if the aircraft roll angle or pitch angle reaches an alert level (alert roll, alert pitch, and the roll rate or pitch rate) at that moment or shortly after that moment reaches or exceeds the TopOmegaX (TopOmegaZ) value and this value is the same sign as the roll angle (pitch angle), then an automatic ejection takes place.

If, on the other hand, the aircraft reaches the alert (roll or pitch) level but the angular rate either does not exceed the TopOmega value, while the aircraft continues rotation in the same direction, and then reaches the maximum permissible value (top roll, top pitch) then an automatic ejection takes place. This is a simplified version of what might transpire in the subject embodiment.

However, there are far more complex arrangements that can be adapted to the operation of the present invention. Redundancy is one such function. Pitch, angle and roll angle can each be used by themselves as sensor inputs. On the other hand, they can also be used together. Preferably, there are always at least two inputs from separate independent sensors for either or both of pitch angle and roll angle. This is especially important should one of the sensors be lost due to electrical failure or catastrophic incident. Consequently, one embodiment uses two channels with the recombination of signals from sensor sources 1 and 2. Accordingly, failure of the automatic escape system is far less unlikely due to this redundancy. In fact, it is calculated to be statistically zero (less than $1e^{-7}$).

Among suitable methods to ensure that false ejection signals are not triggered by inoperable sensors include the use of median filters or other devices known to those skilled in the art. In this way, aberrations are eliminated since they are buffered by the values of all of the other valid sensor readings obtained and used in the filter. A median filter is only one example of many similar types of data handling and buffering techniques. The key here is that aberrations are minimized in order to prevent the chance of a false ejection signal from being generated.

Another technique for avoiding errors caused by sensor malfunction, or misreading of the sensors, is monitoring the sign of each of the sensor readings, and comparing it with a reference sign taken from a previous sensor reading. This helps to account for rapid fluctuation or fluttering of the sensors, as well as abnormal fluctuations that might be manifested by reverse signs. However, the specifically described technique is not necessary for the operation of the present invention, and need not be used at all. Also, other similar techniques for dealing with sensor fluctuations or massive variances can be used instead.

In the present embodiment, the AES is especially critical to crew safety during the vertical modes of flight, and has been configured, (including the values of Table 1 and 2) to operate responsive to vertical flight mode parameters. It should be noted that the use of the AES system of the present embodiment does not prevent or otherwise influence operation of manual ejection at any time.

Relative to total flight time the period during which the AES operates is quite short. For example the takeoff and transition to control speed normally does not take more than two to three minutes. Breaking and transition to vertical landing and the vertical landing itself takes approximately the same amount of time. Accordingly, the operation of this particular embodiment has been configured to both provide a maximum level of reliability and to "predict" the rapid deterioration of a situation to an irreversible deterioration of the aircraft operating situation.

To further facilitate reliability, the present embodiment consists of two similar, and fully independent modules. Module number 1 is active, and relies upon a first bus. Module number 2 is held in a standby mode and is connected to a separate bus. Using standard avionics techniques, the two modules can be interconnected so that one continues to provide sensing signals if the other is lost. The other connection scheme eliminates inadvertent system initiation in case of the failure of any one element.

Each of the three Module-1 channels (1-1, 1-2, 1-3) includes four circuits (21, 22, 23, 24) with the same logic that responds to STOVL aircraft rotation about longitudinal [roll] and transversal [pitch] axes in clockwise and anti clockwise directions. The negative pitch (nose down) STOVL aircraft rotation sensing and response logic chart (22) is also shown on FIG. 2 as an example. Two other circuits (23, 24) for negative roll and positive pitch control are indicated symbolically.

It should be noted that parameters $\gamma_1$, $-\gamma_1$, $\upsilon_1$, $-\upsilon_1$ and $\gamma_2$, $-\gamma_2$, $\upsilon_2$, $-\upsilon_2$ are supplied from different and independent aircraft sensors (6) and this protects the proposed AES system from false functioning, when one of the sensors fails. The number and positioning of sensors can change from aircraft to aircraft.

Figure 3:
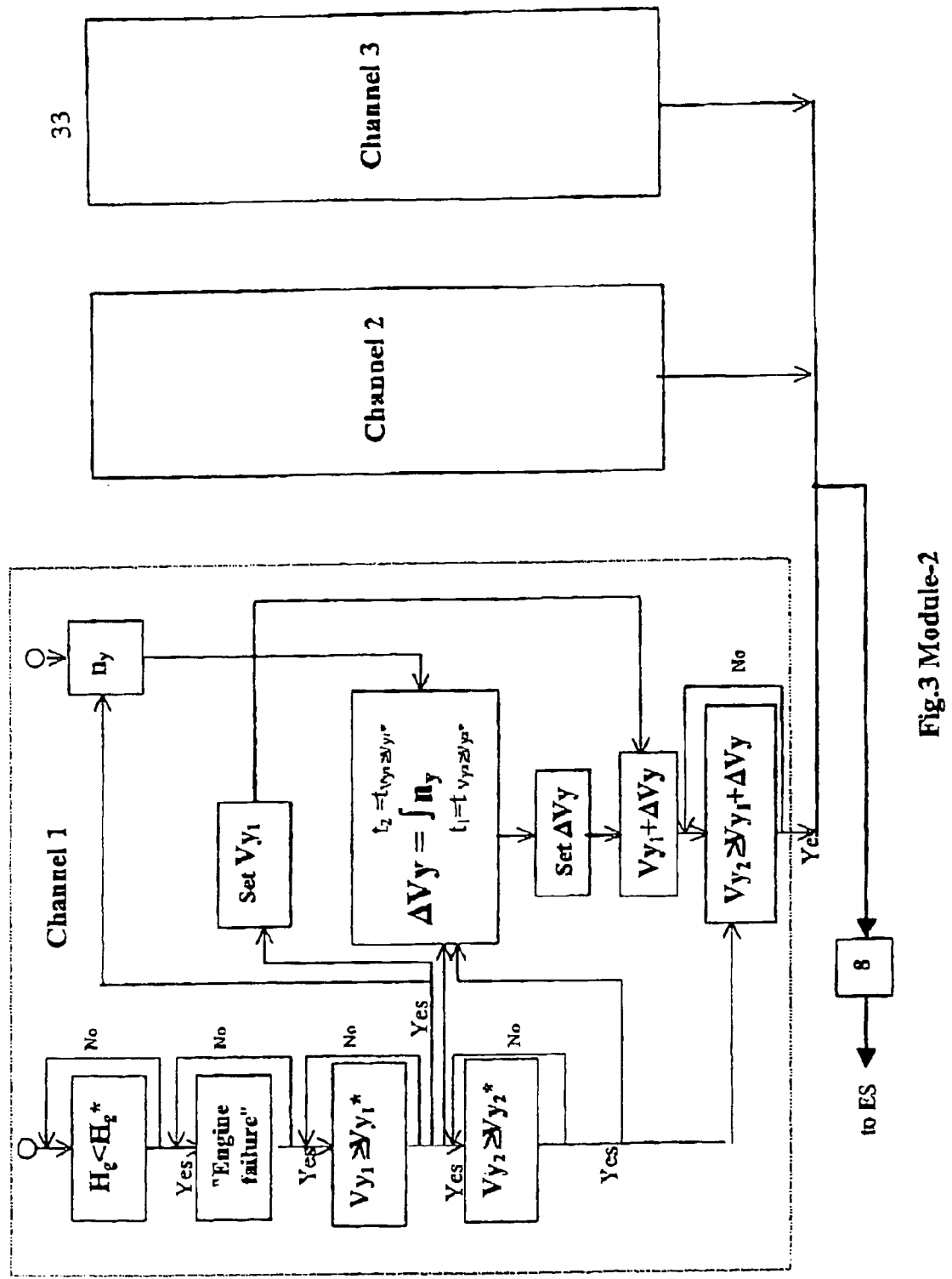
FIG. 3 is a flow diagram depicting an algorithm of Module-2, which senses and responds to aircraft power plant state.

FIG. 3 depicts the logic chart of a first channel (31) for Module-2 that senses and responds to the state of the aircraft power. The multiplex data bus (11) provides this Module aircraft physical height above ground $H_g$, vertical G-load $n_y$, aircraft sink rate $V_y$, and "engine failure" signal (generated the same way as the "engine failure" signal for aircrew information).

At a physical height above ground less than $H_g^*$ (stored in processor for the specific aircraft type) and appearance of an "engine failure" signal, if aircraft sink rate is more than $Vy_1^*$ (also stored in processor for the specific aircraft type), the integrator is switched on to calculate sink rate increment $\Delta Vy$ from the moment, when $Vy_1 \geq Vy_1^*$ until the moment, when $Vy_2 \geq Vy_2^*$ and simultaneously the current value of $Vy_1$ is set. The $Vy_2^*$ value is stored in the processor for the specific aircraft type and must not be less than $2Vy_1^*$. When the condition $Vy_2 \geq Vy_1 + \Delta Vy$ is met, a signal is generated to power switch (8) that energizes the electrically fired initiator (4) of the ejection seat system.

Thus, for example, if an aircraft is at height $H_g$, less than 1000 ft., and in the take off/landing regime with an "engine failure" signal and a loss of altitude with a sink rate increase from $Vy_1$, for example, $-30$ ft/s, to $Vy_2$, for example, $-100$ ft/s, automatic aircrew ejection takes place.

Figure 4:
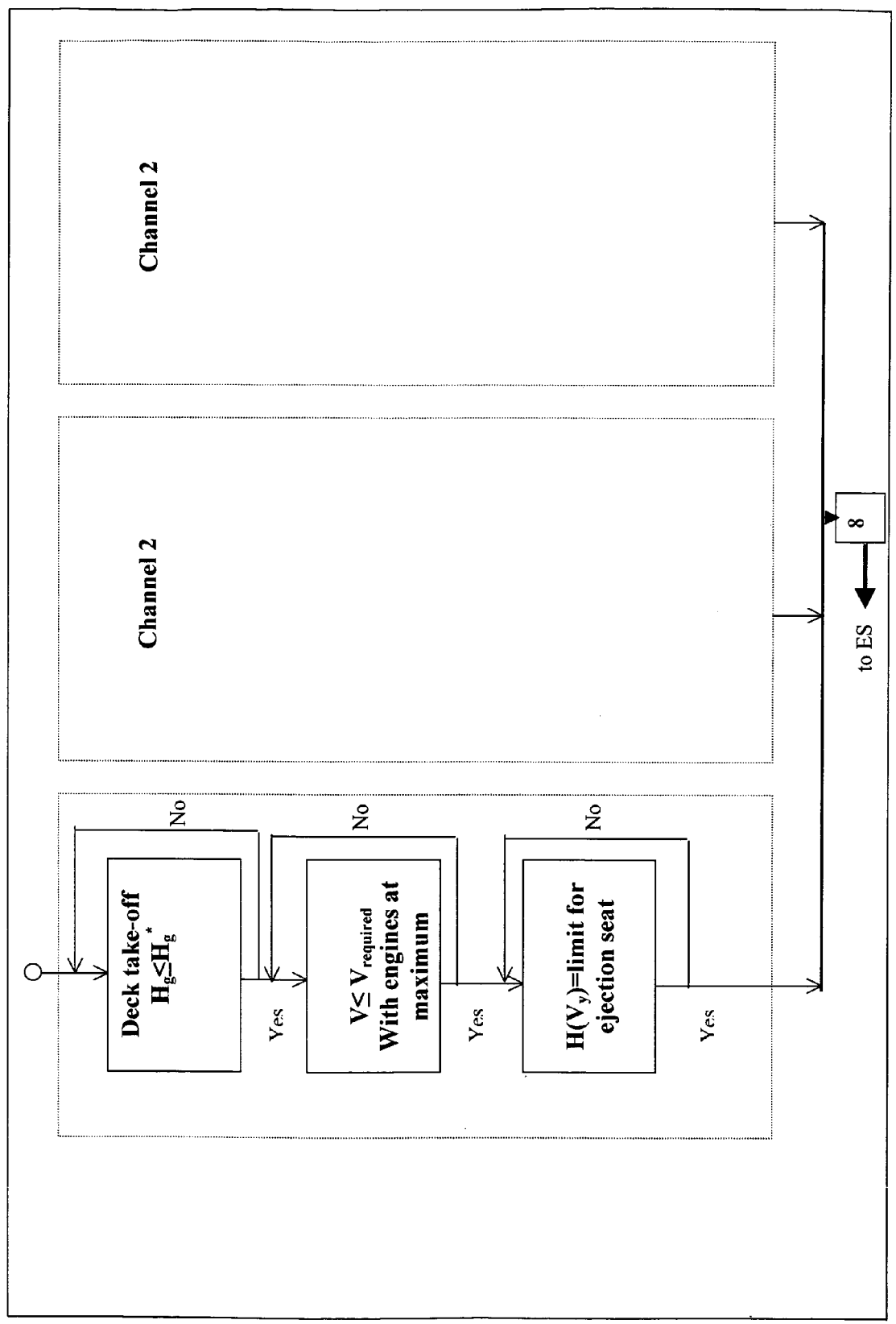
FIG. 4 is a flow diagram depicting an algorithm of Module-3, which senses and responds to failure to attain sufficient velocity to sustain airborne flight following aircraft carrier catapult.

The logic chart for one of three Module-3 channels (41, 42, 43) that sense and respond to failure to achieve a velocity sufficient to maintain airborne flight following catapult launch from an aircraft carrier is presented on FIG. 4. The multiplex digital data bus provides Module-3 data on aircraft physical height of flight $H_g$, and the previously stored value $H_{g\ (min)}$, the lowest acceptable altitude for safe flight, the required velocity for flight $V_{required}$, the actual velocity V, and the sink rate $V_y$. If the aircraft velocity is less than that required to maintain flight ($V < V_{required}$) then the aircraft sink rate ($V_y$) is evaluated, similar to Module-2 to determine if time is available to accelerate the aircraft sufficiently to attain $V_{required}$ prior to attaining $H_{g(min)}^*$. Impact of decreased gross weight on $V_{required}$, due to stores jettison, if effected, is taken into account. If $V_{required}$ is not achievable by $H_{g\ (min)}^*$, the signal is generated to power switch (8) that energizes the electrically fired initiator (4) of the ejection system.

The situation described above is peculiar to aircraft carrier environments after catapult failure at take-off or arresting cable separation on recovery (landing).

As previously indicated, the system is activated by the pilot. However operation of the software begins with system input of operating constants, which reflect the operating profile of both the aircraft, the ejection seat, and the mode of flight. It should be noted that like most of the examples in the present application, the constants of Table 2 are best applied to a STOVL aircraft.

It should be understood that the exact sequence of incrementing can vary from that depicted in FIG. 2. A wide variety of different mathematical techniques can be used to predict when aircraft condition has become irreversibly dangerous. A wide variety of different incrementing/predicting techniques are available within the concept of the present invention. Those depicted in FIG. 2 are merely examples. Any predictive algorithm that allows the system to operate to permit ejection within the safe ejection envelope is considered within the concept of the present invention.

The AES of the present invention enhances modern ejection seat system efficiency and doesn't influence the ability of aircrew to initiate manual ejection at any time, including during onset of rapidly developing emergency situations. Further, the AES can be activated (or deactivated) at any time by the crew using switch (9). Taking into the account the rapidity of onset of many emergency situations, automatic ejection through the canopy is preferred due to the time delay inherent in effecting canopy jettison. This is particularly relevant for VSTOL aircraft since aerodynamic loads on the canopy at or below the control speed (transitional flight) may be insufficient to clear the canopy from the seat trajectory. Ejection through the canopy is common procedure for many modern tactical aircraft.

Modern computers and electronics permit low weight and volume penalties (if a dedicated processor is used) while the triple-modular redundancy of the basic AES software allow for a high level of system reliability.

While a number of embodiments have been referred to by way of example, the present invention is not limited thereto. Rather, the present invention can be applied to virtually any aircraft ejection system. Further, the present invention can be used as a control for hatches and removable canopies, even though no ejection seat is involved. In fact the present invention is applicable to any situation in which, due to changed inputs, specific action or actions must follow subsequent to the change of inputs. Such actions may be required very quickly, as with the automatic escape system, or may have less time sensitivity dependent upon the application at hand.

Also, while a number of very relevant flight and machine parameters have been discussed, this is not an exhaustive list of all the parameters that can be used with the present invention. Other types of aircraft or vehicles having emergency ejection or hatch-release devices can use the present invention. Of course, the particular characteristics of each machine, as well as the particular environments in which those machines operate will determine the parameters that are to be used to trigger or hold the automatic ejection system of the present invention.

While three modules are used with the present invention, additional modules can be added to take into account additional streams of logic that would impact on the use of the automatic ejection or escape system. The safe ejection envelope will be configured by the number and type of modules being used, as well as triggering signals (to power switch (8)) from other aircraft systems (17). While the present modules use 3 circuits and a "majority voting output" logic, this is not necessary for the practice of the present invention. Rather, the present invention can be configured so that a single output can be used to trigger power switch (8). It should be understood that any arrangement of logic in any of the modules (1, 2, 3) can be used to initiate ejection. In particular, any number of catastrophic states inherent to the vehicle or environment can be used to initiate a single signal sufficient to operate the ejection system, instantly and automatically.

Accordingly, the present invention should be construed to include any and all modifications, variations, adaptations, permutations, derivations and embodiments that would occur to one skilled in this art once having been taught the present invention. As such, the present invention should be limited only by the broadest claims of each of the embodiments suggested in this application, or any other claims that could be supported by the present disclosure.

I claim:

1. An automatic emergency device actuation/release system for a vehicle for automatic activation of an emergency device when the operator of the vehicle lacks sufficient time and/or physical ability to react to a rapidly developing and irreversible emergency, said system, comprising:
    (a) data means for inputting constant system values and detected values from sensors;
    (b) first computing means for comparing said constant system values and said detected values to determine an alert condition;
    (c) second computing means, operating responsive to said alert condition, for comparing said constant system values and said detected values to determine a dangerous condition;
    (d) checking means for determining if said vehicle is in a safe range for said emergency device operation; and,
    (e) activation means, operating responsive to detection of said safe range and a dangerous condition, for sending an activation signal to actuate/release said emergency device.

2. The system of claim 1 wherein said emergency device is an ejection device.

3. The system of claim 2, wherein said ejection device comprises a pilot/aircrew seat.

4. The system of claim 3, wherein said seat comprises a parachute.

5. The system of claim 2, wherein said ejection device comprises a hatch.

6. The system of claim 2, wherein said ejection device comprises a balloon cushioning system.

7. The system of claim 1, further comprising: (f) sensing means for detecting at least one catastrophic condition in relation to said vehicle, and generating an actuation/release signal.

8. The system of claim 1, wherein said second computing means comprise calculating means for predicting a dangerous condition by adding an incremental value to an existing sensor value.

9. An automatic emergency device actuation/release system for a vehicle, comprising:
    (a) data means for inputting constant system values and detected values from sensors;
    (b) first computing means for comparing said constant system values and said detected values to determine an alert condition;
    (c) second computing means, operating responsive to said alert condition, for comparing said constant system values and said detected values to determine a dangerous condition;
    (d) checking means for determining if said vehicle is in a safe range for said emergency device operation; and,
    (e) activation means, operating responsive to detection of said safe range and a dangerous condition, for sending an activation signal to actuate/release said emergency device
    wherein said second computing means comprise calculating means for predicting a dangerous condition by adding an incremental value to an existing sensor value and said calculating means operates to modify a current sensor reading before adding it to said previous sensor value.

10. The system of claim 9, wherein said calculating means operates to form an integral of said incremental value of a present sensor reading.

11. The system of claim 7, further comprising: (g) sorting means for determining particular sensor readings to be used by said first computer means and second computer means.

12. A process for operating an automatic emergency device actuation/release system for a vehicle, comprising the steps of:
(a) inputting constant system values, and detected values from sensors into said system;
(b) comparing said constant system values and said detected values to determine the existence of an alert condition;
(c) responsive to detecting said alert condition, comparing said constant system values and said detected values to determine existence of a dangerous condition;
(d) determining if said vehicle is in a safe range for said emergency device operation; and,
(e) responsive to detection of said safe range, and existence of said dangerous condition, sending an activation signal to release said emergency device.

13. The method of claim 12, wherein said emergency device is an ejection device.

14. The method of claim 13, wherein said ejection device is a pilot/aircrew seat.

15. The method of claim 14, wherein said pilot seat comprises a parachute.

16. The method of claim 13, wherein said ejection device comprises a hatch.

17. The method of claim 13, wherein said ejection device comprises a balloon deployment system.

18. The method of claim 12, further comprising the step of detecting for a catastrophic condition in relation to said vehicle, thereby sending an activation signal for actuation/release of said emergency device.

19. The method of claim 12, wherein step (c) comprises the substep of: (i) predicting a dangerous condition by adding an incremental value to a previous sensor reading.

20. A process for operating an automatic emergency device actuation/release system for a vehicle, comprising the steps of:
(a) inputting constant system values, and detected values from sensors into said system;
(b) comparing said constant system values and said detected values to determine the existence of an alert condition;
(c) responsive to detecting said alert condition, comparing said constant system values and said detected values to determine existence of a dangerous condition and predicting a dangerous condition by adding an incremental value to a previous sensor reading, wherein said incremental value is a modified sensor reading;
(d) determining if said vehicle is in a safe range for said emergency device operation; and,
(e) responsive to detection of said safe range, and existence of said dangerous condition, sending an activation signal to release said emergency device.

21. The method of claim 20, wherein said incremental value is an integral of a current sensor reading.

22. The method of claim 12, wherein prior to step (b), determining a sequence of particular sensor readings to be used in steps (b) and (c).

23. An automatic ejection device actuation/release system for a short take-off vertical landing aircraft for use in vertical modes of operation, said automatic ejection system comprising:
(a) data means for inputting constant system values and detected values from sensors;
(b) first computing means for comparing said constant system values and said detected values to determine an alert condition during said vertical mode of operation;
(c) second computing means, operating responsive to said alert condition for comparing said constant system values and said detected values to determine a dangerous condition;
(d) checking means for determining if said aircraft is in a safe range for said ejection device operation; and,
(e) activation means, operating responsive to detection of said safe range and a dangerous condition, for sending an activation signal to actuate/release said ejection device.

24. The system of claim 23 wherein said ejection device is selected from the group consisting of a pilot/aircrew seat, a pilot/aircrew seat with a parachute, a hatch, and a balloon cushioning system.

25. The system of claim 23 wherein said ejection device is actuated only when the speed of the aircraft is less than control speed and aerodynamic forces are insufficient to support the aircraft in flight.

26. The system of claim 23, further comprising: (f) sensing means for detecting at least one catastrophic condition in relation to said aircraft, and generating an actuation/release signal.

27. The system of claim 23, wherein said second computing means comprise calculating means for predicting a dangerous condition by adding an incremental value to an existing sensor value.

28. The system of claim 27, wherein said calculating means operates to modify a current sensor reading before adding it to said previous sensor value.

29. The system of claim 28, wherein said calculating means operates to form an integral of said incremental value of a present sensor reading.

30. The system of claim 26, further comprising: (g) sorting means for determining particular sensor readings to be used by said first computer means and second computer means.

31. A process for operating an automatic ejection device actuation/release system for a short take-off vertical landing aircraft for use in vertical modes of operation, said process comprising the steps of:
(a) inputting constant system values, and detected values from sensors into said system;
(b) comparing said constant system values and said detected values to determine the existence of an alert condition;
(c) responsive to detecting said alert condition, comparing said constant system values and said detected values to determine existence of a dangerous condition;
(d) determining if said vehicle is in a safe range for said ejection device operation; and,
(e) responsive to detection of said safe range, and existence of said dangerous condition, sending an activation signal to release said ejection device.

32. The method of claim 31, wherein said ejection device is selected from the group consisting of a pilot/aircrew seat, a pilot/aircrew seat with a parachute, a hatch and a balloon deployment system.

33. The method of claim 31 wherein said vertical mode of operation is selected from the group consisting of hover, short take-off, transition, and landing.

34. The method of claim 31 wherein said ejection device is actuated only when the speed of the aircraft is less than control speed and aerodynamic forces are insufficient to support the aircraft in flight.

35. The method of claim 31, further comprising the step of detecting for a catastrophic condition in relation to said aircraft, thereby sending an activation signal for actuation/release of said ejection device.

36. The method of claim 31, wherein step (C) comprises the substep of: (i) predicting a dangerous condition by adding an incremental value to a previous sensor reading.

37. The method of claim 36, wherein said incremental value is a modified sensor reading.

38. The method of claim 37, wherein said incremental value is an integral of a current sensor reading.

39. The method of claim 31, wherein prior to step (b), determining a sequence of particular sensor readings to be used in steps (b) and (c).

* * * * *